(12) United States Patent
Hsu

(10) Patent No.: US 6,804,394 B1
(45) Date of Patent: Oct. 12, 2004

(54) SYSTEM FOR CAPTURING AND USING EXPERT'S KNOWLEDGE FOR IMAGE PROCESSING

(76) Inventor: Shin-yi Hsu, 2312 Hemlock La., Vestal, NY (US) 13850

( * ) Notice: Subject to any disclaimer, the term of this patent is extended or adjusted under 35 U.S.C. 154(b) by 0 days.

(21) Appl. No.: 09/975,228

(22) Filed: Oct. 11, 2001

Related U.S. Application Data

(63) Continuation of application No. 09/058,473, filed on Apr. 10, 1998, now abandoned.

(51) Int. Cl.[7] ................................................ G06K 9/34
(52) U.S. Cl. ...................... 382/173; 382/305; 382/113
(58) Field of Search ............................ 707/1–6, 7–10, 707/100–102, 104.1; 382/173, 155–159, 113, 305, 199, 203, 162, 164, 165, 108, 224, 191, 195, 197, 201, 242, 243, 109; 706/55–59, 45–48

(56) References Cited

U.S. PATENT DOCUMENTS

| | | | |
|---|---|---|---|
| 5,193,185 A | * 3/1993 | Lanter | 707/101 |
| 5,274,715 A | * 12/1993 | Hsu | 382/109 |
| 5,325,465 A | * 6/1994 | Hung et al. | 706/55 |
| 5,631,970 A | * 5/1997 | Hsu | 382/113 |

OTHER PUBLICATIONS

Vellaikal et al., Joint spatial–spectral indexing for image retrieval, Sep. 1996, IEEE 0–7803–3258–X/96, 867–870.*
Hermes et al., Image Retrieval for Information system, SPIE vol. 2420, pp. 394–405.*
Soffer et al. Retrieval by content in symoblic–image databases, SPIE, vol. 2670, pp. 144–155.*

* cited by examiner

*Primary Examiner*—Leo Boudreau
*Assistant Examiner*—Ishrat Sherali
(74) *Attorney, Agent, or Firm*—Mark Levy & Assoc.

(57) ABSTRACT

The present invention relates to an apparatus and a method for object detection in an image. The apparatus for this invention includes a preprocessor, a detector, a segmentor, a classifier, a classifier systems integrator, a system output and a post processor. The method for object detection allows the user to identify an object by using three approaches: (1) a segmentation detector, (2) a pixel-based detector, and (3) a grid-cell and mesotexture based detector. All three of the aforementioned approaches allows the user to use a pseudo-English programming language in the processing system for object detection. This invention allows the user to use an expert's knowledge and convert it to object based content retrieval algorithms. The user can preserve the segmented scenes of the original data and perform a raster-to-vector conversion which preserves the size and shape of the original objects. Further, the object based image data can be converted into geographic information system (GIS) layers which can be analyzed using standard GIS software such as ARC/Info or ARC/View.

7 Claims, 11 Drawing Sheets

$$b_6\ b_5\ b_4\ b_3\ b_2$$
$$b_7\ X\ X\ X\ X\ b_1$$
$$b_8\ X\ X\ X\ X\ b_0$$
$$b_9\ b_{10}\ b_{11}\ b_{12}\ b_{13}$$

X (x,y) as interior pixels
$b_1$ (x,y) as boundary pixels

```
1       /* for region #1 */
x y     /* for b 1 */
x y     /* for b 2 */
x y     /* for b 3 */
x y     /* for b 4 */
x y     /* for b 5 */
x y     /* for b 6 */
x y     /* for b 7 */
x y     /* for b 8 */
x y     /* for b 9 */
x y     /* for b 10 */
x y     /* for b 11 */
x y     /* for b 12 */
x y     /* for b 13 */
END
2       /* for region #2 */
x y     /* same as region #1 */
. .
. .
x y
END
```

*Figure 8*

SYSTEM FOR CAPTURING AND USING EXPERT'S KNOWLEDGE FOR IMAGE PROCESSING

This is a continuation of U.S. patent application Ser. No. 09/058,473, filed Apr. 10, 1998 now abandoned.

FIELD OF THE INVENTION

The present invention relates to systems and methods for identifying objects within an image and, more particularly, using experts' knowledge to convert one or more pixels in a hyperspectral image into a 3-D image and for matching the hyperspectral image with predefined images for object recognition purposes.

BACKGROUND OF THE INVENTION

In the field of image processing, it is desirable to improve search and knowledge extraction capabilities in order to facilitate the identification of features therein. One of the factors behind this pressing need is the imminent retirement of data experts who have rich experience and irreplaceable knowledge in information extraction with nuclear test data since the Cold War period. Another factor is the deterioration of the media in which the data is stored to the point that the data in its original form is not comprehensible. The present invention is motivated by the fact that none of the current content based retrieval (CBR) systems can be used to factor data experts' knowledge into the system described in articles in "Storage and Retrieval Image and Video Database I, II, III, IV, and V" (SPIE, 1993 through 1997).

In the physical world, an object is perceived as a two-dimensional and/or a three-dimensional entity that has a certain graytone, color, size and shape. To perceive the existence of such a color/size/shape defined object, the image data set must be processed so that pixels of similar properties can form a uniform field, the size and shape of which are measurable. The means by which these uniform fields are generated is referred to as a segmentation algorithm. Among the current systems, work by Soffer and Samet deals with symbolic-image databases with an emphasis on the concept of an object vs. a full scene or a grid cell. (SPIE Vol. 2679, pp 144–155.) The object by Soffer and Samet is a map feature in which segmentation is not needed.

In order to archive the information in a generic image automatically, the user must take an inventory of the features in the scene. The user must aggregate a set of spatially contiguous pixels into one substantially uniform region first. This pixel grouping process, generally referred to as segmentation, is the process of partitioning a scene into a set of uniform regions. But there are countless ways to segment an image; yet few of these ways are reliable enough for the user to obtain consistent results with imagery of diverse characteristics acquired at varying time intervals. A number of sophisticated segmentation methods have been developed. For example, an edge based segmentation method is disclosed by 20 Farag (1992), a region based method by Hsu (1992), a Markov random field based method by Tenior (1992), and a texture based method by Ma and Manjunath (1996). Ma and Manjunath discuss a comprehensive treatment for segmentation and region merging. Ma and Manjunath's algorithms appear powerful and effective; the feature extraction is totally texture and grid cell based. Nevertheless, the fundamental difficulty in segmentation remains to this day.

The field that deals with enhancing the visual quality of an image and extracting information of an image is called image processing, pattern recognition, remote sensing, or photogrammetry. Objects in a generic image comprising one or more layers are conventionally stored as data representing graytone and/or color pixels mixed with background pixels. Each subject can be identified by matching it against elements of a spectral library, provided with enough bands, such as that in a hyperspectral image cube. The end result of this matched filtering process is a still, pixel classification map, which shows no information other than the fact that each pixel belongs to a specific class or material type.

In the past, a spectral angle mapper of pixel based spectral matching was used to compare an observed waveform (i.e., spectral signature with elements of a spectral library). In the present invention, each pixel is treated as if it is an element of the library; therefore, there is no need to create a spectral library at all.

When a Principal Component (PC) process is used in order to detect objects in images, two major problems exist. First, a PC transform is not based on any objects. Therefore, the selected PC scenes may not contain the desired objects. Second, as documented by Schott, a PC scene is based on variance. Therefore, a low contrast band will not be exhibited, signifying a loss in the depiction of an image.

The relevant papers in "Storage and Retrieval for Image and Video Databases", published by SPIE in 1993, reveals that few of the current systems are object based. In fact, the vast majority are full scene and/or grid cell based. (NeTra, by Ma and Manjunath of UC Santa Barbara, 1997.) One of the few object based programs deals only with simple objects such as human flesh tone vs. the background. (Tao, et al., SPIE Vol. 3002 p. 340–351, 1997.) The lack of object based systems is closely tied to the inability to segment a scene reliably and meaningfully. The reliability issue is associated with the stability of partitioned regions in the scene, whereas the meaningfulness of the scene is dependent on whether the knowledge of data experts is used in the segmentation algorithm.

There is a lack of lexicon data experts in Image Content Retrieval Systems. A brief review of current image database search systems discussed in SPIE's "Storage and Retrieval of Image and Video Databases (1993–1997)" reveals that most image databases use a subset of tone (color), texture and shape principles. Data experts' knowledge using combinations of key words is simply not used in object extraction algorithms.

The present invention operates in the inventor's IMaG system and uses a pseudo-English programming language, which includes processing and query language. The IMaG system integrates: (1) image processing, (2) multi-source analysis, and (3) GIS (Geographic Information Systems) into one single environment that possesses the tools to assist in solving smart imagery archiving problems. For example, the user can capture the knowledge of data experts and convert it to object based content retrieval algorithms; and then use these expert systems to extract the target objects in the scene, outlining and labeling each of them with appropriate text and color symbols automatically. As a result, the experts' knowledge is used directly to create an enhanced image that contains both textual and logical representations in addition to the original physical representation.

The benefits of textual information for information retrieval is discussed by Kurakake, et al. (SPIE, Vol. 3022, 20 pp. 368–379.) In addition, similar systems, such as DocBrowse, are discussed by Jaisimba, et al. (SPIE, 5 Vol. 2670, pp. 350–361) and IRIS by Hermes, et al. (SPIE Vol. 2420, pp. 394–405) assumes that textual data is already on the images. The above mentioned systems simply assume that text describing the image is on the image without knowing whether the image directly corresponds with the text. In contrast to this invention, the textual information is inserted into the original image after a feature extraction process is completed.

In order to extract an object from an image data set, the user must perform a number of information processing steps. The most crucial step of all is programming the algorithm with a machine-understandable language. Programming with a conventional machine language such as FORTRAN, C, and/or C++, however, is tedious, time-consuming and error prone. Most languages used for retrieval purposes in conventional systems are generally known as query languages. One of the well-known languages is the Manchester Visual Query Language (Oakley, et al., SPIE, Vol. 1908, pp. 104–122.) Another language is the QBIC system, which is used for querying by color, texture and shape. (SPIE, Vol. 1908, pp. 173–187.)

Varying scenarios of image conditions and scene complexity can prevent the algorithm from finding the intended objects, despite the fact that a pseudo-English programming language can convert a concept to a computer executable program with ease. This is particularly true when the attributes of an observed, segmented object does not fit the definition of objects in the rule set. In addition, none of the existing image content retrieval systems is capable of converting a rule set of an individual data expert into a feature extracting algorithm in near real time. The rule set will not commit an error of commission under these conditions, but it would be desirable for additional object detection means to be provided as a complementary, or backup system.

In certain cases, the algorithm is virtually unprogrammable, simply because it is extremely difficult to translate a human-based concept to a machine language. Relating two objects that reside on two distinct image layers is a case in point. The present invention reflects a solution to this problem of incorporating a conventional machine language. It uses a pseudo-English programming language described in U.S. Pat. No. 5,631,970, issued on May 20, 1997, hereby incorporated by reference,.

Computer users presently use a device called a Graphic User Interface (GUI), which has been invented to lessen the burden of typing upon a computer keyboard. Using the GUI, the user communicates with a computer through a mouse, and performs essentially only two actions: "point" and "click". Even the simplicity of the point and click method, however, can become a burden, if numerous point and clicks are necessary to initiate the execution of a program. The same process can be achieved by typing simple script under a UNIX operating system.

The minimalistic approach of pointing and clicking has been achieved to a certain degree in the database management field. It requires that data be organized in an orderly fashion. An attribute table is used to organize a data set in rows and columns, with each object occupying a row. On the other hand, image data is totally unsorted. Thus, the user cannot use a conventional GUI with ordinary database management software to point and click an object. For example, the user can attempt to extract a bright object, but it would be extremely difficult for the user unless the object itself were identified with a brightness attribute. Therefore, minimalism in GUI should be interpreted as an object extraction model that defines the characteristics of the target model. A minimalism based object identification and extraction process is achieved if the GUI is intelligent enough to take the target characteristics of the perceived object from the user, and convert the information into a text file based program.

In object identification and recognition, not all users prefer simple objects. At one extreme, the user may wish to compose the program unassisted and without any restrictions imposed by the models in the program. On average, users may use the intelligent GUI to assist in composing the script or rule set to answer a set of questions, without typing a text file.

Another factor that conventional content-based retrieval systems do not consider is the possible loss of the original data due to deterioration of the storage media. To preserve the segmented scenes of the original data, the inventive system performs a conversion, preserving the size, shape and even the topological information among regions/polygons. The means for converting raster segmented scenes into corresponding vectors is called a raster to vector conversion, while the reverse process is called vector to raster conversion. This vectorization process allows users to retrieve objects on a feature attribute table representation level.

Converting a segmented image into a corresponding vector representation yields two obvious benefits. First, the essential scene structure based information can be stored in a vector format for efficient storage and preservation without the loss of significant information. Second, efficient information retrieval and analysis can be realized in a Geographic Information System (GIS) environment.

The GIS based approach to image segmentation and data representation for information creation and retrieval is largely lacking in current systems. The accuracy of a feature vectorization process has long been a concern in the GIS community. For example, it was stated that "Rules have been established to control the conversion of raster to data vectors. However, the effects of the shape, size and spacing of polygons on the conversion process have not been vigorously explored. It is critical that research be undertaken to explore the effects of the raster-to-vector conversion process for digital remotely sensed data. Methods of quantifying the variation between vector-to-raster and raster-to-vector conversions must be developed. Only when the results from a variety of studies performing such conversions are understood and quantified can we begin to employ these techniques with some degree of confidence." (Closing Report of Research Initiative 12 of the National Center for Geographic Information and Analysis (NCGIA), p. 9, July, 1995, sponsored by the National Science Foundation.)

The object based image data can be converted into bonafide GIS layers that can be analyzed using standard GIS software such as ARC/Info or ARC/View. When information is partitioned into individual layers, each object in each layer, which is equivalent to a segmented image, is represented by its boundary contour in terms of node, arc and polygon. The entire scene is described by a feature attribute table, typically in a DBF format, that can be read by standard database management software such as dBASE.

It would be advantageous to provide a variety of means to process varying types of image data ranging from a zero band, such as a geo-position system (GPS) to n-band data, such as a hyperspectral image cube that contains hundreds of bands.

It would also be advantageous to provide a variety of strategies for object detection in such a way that an object can still be detected if a segmentor fails to perform the task.

It would also be advantageous to provide a segmentor to integrate varying object detection means.

It would also be advantageous to provide a mechanism for using a pseudo-English programming language with an intelligent GUI to identify and/or extract objects in images and/or any geo-coded data, with a varying degree of interaction between the user and the machine system.

It would also be advantageous to provide a mechanism for identifying and/or recognizing an object in any spatial data, including GPS, by browsing through a set of object recognition models and selecting one to execute the programs.

It would also be advantageous to provide a mechanism to identify and recognize an object in geo-spatial data by answering only a few questions.

It would also be advantageous to provide a system for identifying and recognizing an object in geo-spatial data by answering a set of questions as the basis for generating a complex object identification rule set script.

It would also be advantageous to provide advanced users with a system to identify and extract objects in spatial and geo-spatial data by composing a script with a standard general editor.

It would also be advantageous to provide a vectorizer/rasterizer system that treats an object vectorization as a data compression process in which the compression process is totally preserved without losing information and creating errors in location, size and shape of a polygon.

SUMMARY OF THE INVENTION

In accordance with the present invention, there is provided a process and a processing architecture for identifying and/or extracting an object from spatial and geo-spatial data, such as images, maps and GPS-generated data. The system allows an operator, using an intelligent graphic user interface (GUI), to communicate with the processing system, using varying levels of interaction.

First, a totally automated mode allows an operator to extract an object by browsing through a set of j models, and then to select an appropriate one to run the program. Second, an expert modeler allows an operator to answer a few questions with which the system can generate a bonafide rule set script. Third, an expert editor allows an operator to answer a set of questions as the basis for generating a complex object identification and/or extraction program without a general editor. Fourth, the advanced user is able to use the general editor to compose a rule set which identifies the object.

An appropriate programming language in which to compose a rule set to accomplish the object identification comprises a human-like, pseudo-English language, which uses a lexicon of human photo-interpreters. Key words such as tone, texture, size, elongation, convolution, within, touches, approaches, etc., are part of this lexicon. This approach is presented in the aforementioned U.S. Pat. No. 5,631,970. The pseudo-English programming language simplifies the programming process for extracting objects with image data, but requires composing and typing using a general editor. Composing the rule set and typing the text file are still two steps away from the user and the computer. From the vantage point of the user, it would be useful to obtain a target object without being required to make a keystroke. The user should have to make only a minimum number of keystrokes, if keystrokes are needed at all.

For example, the user can first set the rule based object extraction process as a full scene based segmentation analysis. Then the first complementary object detection process can be based on a pixel based analysis, using a bright pixel detector in conjunction with a density based post processor.

The present invention uses a hyperspectral texture analysis, which is a bonafide image normalization process, and a feature enhancement process. It is a data compression process that does not lose any information, since none of the original information is discarded in the process. Three searching windows, a compressed image cube of hundreds of bands, can yield three transformations.

The proposed hyperspectral texture transform does not lose the desired objects or information about the objects during the transform. In fact, in this invention, the textual transformation creates additional information for the object simply by adding a spatial dimension to the original data set.

The present invention has a complementary approach to solving the problem of object detection by use of segmentation. A grid system is used to partition a scene into a set of grid cells or tiles, and then the likelihood that a man-made object is imbedded in a natural environment is determined. Once an area of interest (AOI) is determined, the user can proceed to extract and identify the object imbedded in the AOI by using a segmentor-based and/or a matcher-based classifier. A possibility for the grid cell based object detection system can is illustrated in U.S. Pat. No. 5,341,439, issued to the present inventor, hereby incorporated by reference.

In addition, the present invention uses a mesotexture based matrix for object detection. The size of an object searching grid, such as 64×64 or 96×96, is defined by the feature extraction algorithm combined with the extraction of the mesotexture measure for each cell. The mesotexture based matrix is normalized using a ratio based operation with which the first element of a row or column is set to 1, the second element is divided by the first element, the third element is divided by the second element, and so on. The result of this pair-wise ratio based operation is a set of matrices: 1) a row-direction based transform, and 2) a column-direction based transform. Next, a set of mesotexture based statistics is devised to rank the cells in terms of the likelihood of the existence of a man-made object in a natural environment. One of the cell ranking criteria can be based on the magnitude of the normalized mesotexture values.

The present invention uses an IMaG ? system to perform a raster to vector conversion used to preserve the size, shape and even the topological information among regions/polygons. The vectorization process allows the user to retrieve objects on a feature attribute table representation level. The pseudo-English programming language of the IMaG system is a dual functioning language which simultaneously processes and queries. The user can extract any object that meets the user's criteria.

The present invention integrates a vectorizer and a rasterizer with the main processor. A base map is a segmented raster image, and the digital value of the interior pixels of each region corresponds to the region ID code. Each feature of a scene is subjected to a vectorization process performed by using a totally automated process by using the region ID code raster image as the input. The aforementioned vectorization process is totally reversible. Therefore, possible errors in size, shape and location can be detected. By using two feature attribute tables, one generated with the original image and the other generated by using the rasterized image with the vector data as the input, errors are detected. In addition, an expert's knowledge can be captured and then the newly-created intelligence can be inserted back to the original database, yielding an enhanced database.

The system is also designed for multi-band data, integrating image processing, multisource analysis and GIS into one single system. In the GIS community, information is partitioned into individual layers. Each object in each layer is equivalent to a segmented image which is represented by its boundary contour in terms of node, arc and polygon. The whole scene is described by a feature attribute table. The feature attribute table is typically in a DBF format that can be read by standard database management software, such as dBASE.

BRIEF DESCRIPTION OF THE DRAWINGS

A complete understanding of the present invention may be obtained by reference to the accompanying diagrams, when taken in conjunction with the detailed description thereof and which:

FIG. 8 is a typical data file wherein x is an interior pixel and b is a boundary pixel;

DESCRIPTION OF THE PREFERRED EMBODIMENT

Referring now to the various figures of the drawings, a preferred embodiment of the present invention shall be described in detail. Like numerals shall refer to like parts.

Figure 1:
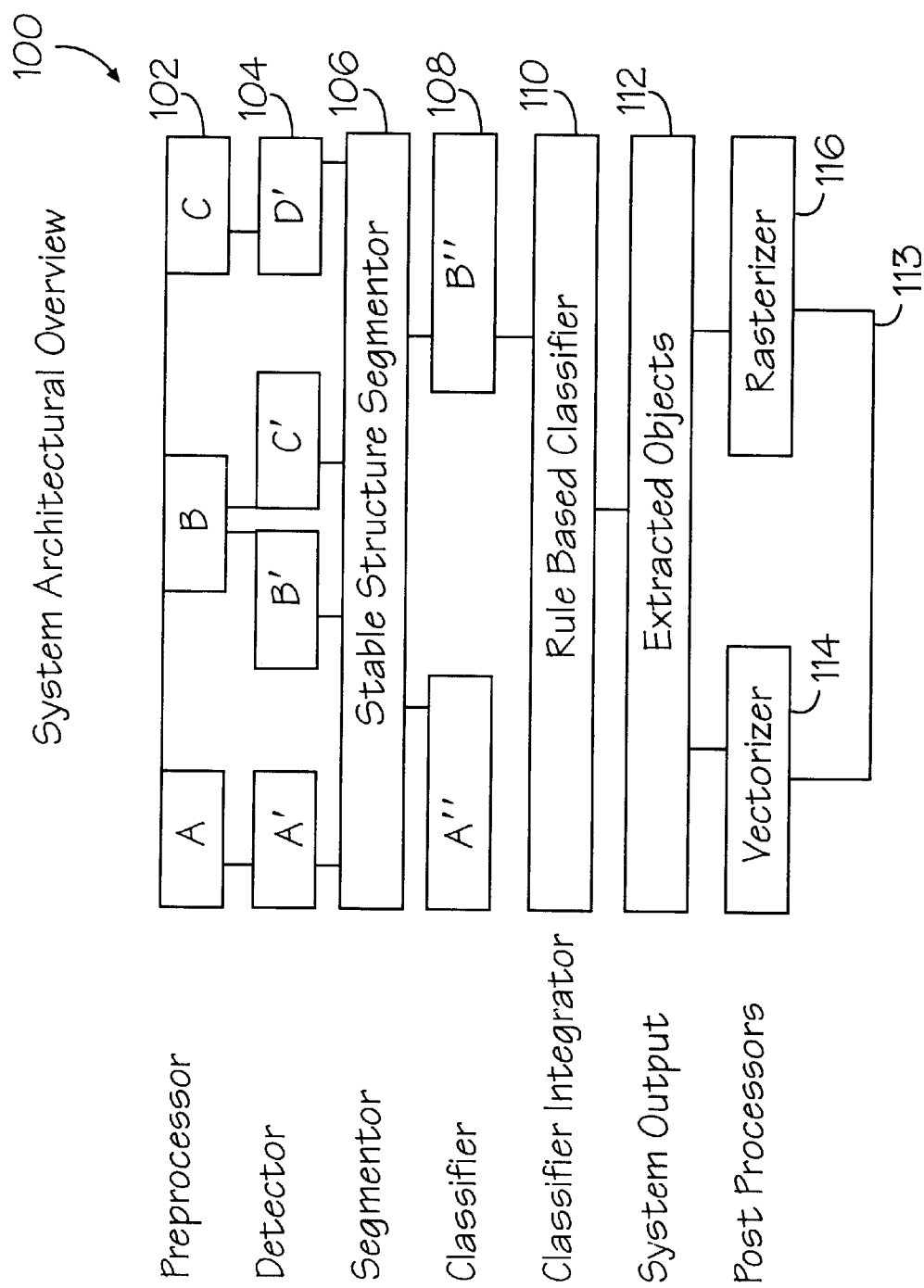
FIG. 1 is a block diagram representation of the processing architecture of the present invention.

Referring now to FIG. 1, the architecture of the present invention, shown generally as reference numeral 100, comprises three preprocessors 102, labelled A, B and C. Connected to the preprocessors 102 are detectors 104, labelled A', B', C' and D'. Specifically preprocessor A is operatively connected to detector A'. Specifically preprocessor B is operatively connected to detector B' and C'. Specifically preprocessor C is operatively connected to D'. Connected to the detectors 104, is the segmentor labelled stable structure segmentor 106. Specifically detector A', B', C' and D' is operatively connected to stable structure segmentor 106. Connected to the stable structure segmentor 106, is the classifiers 108, labelled A" and B". Specifically stable structure segmentor 106 is operatively connected to A" and B". Connected to the classifier 108, is the classifier integrator 110, labelled rule based classifier. Connected to the classifier integrator 110, is system output 112, labelled extracted objects. Connected to the system output is the post processor 113, labelled vectorizer 114 and rasterizer 116. Specifically the system output 112, is operatively connected to vectorizer 114 and rasterizer 116.

Figure 2:
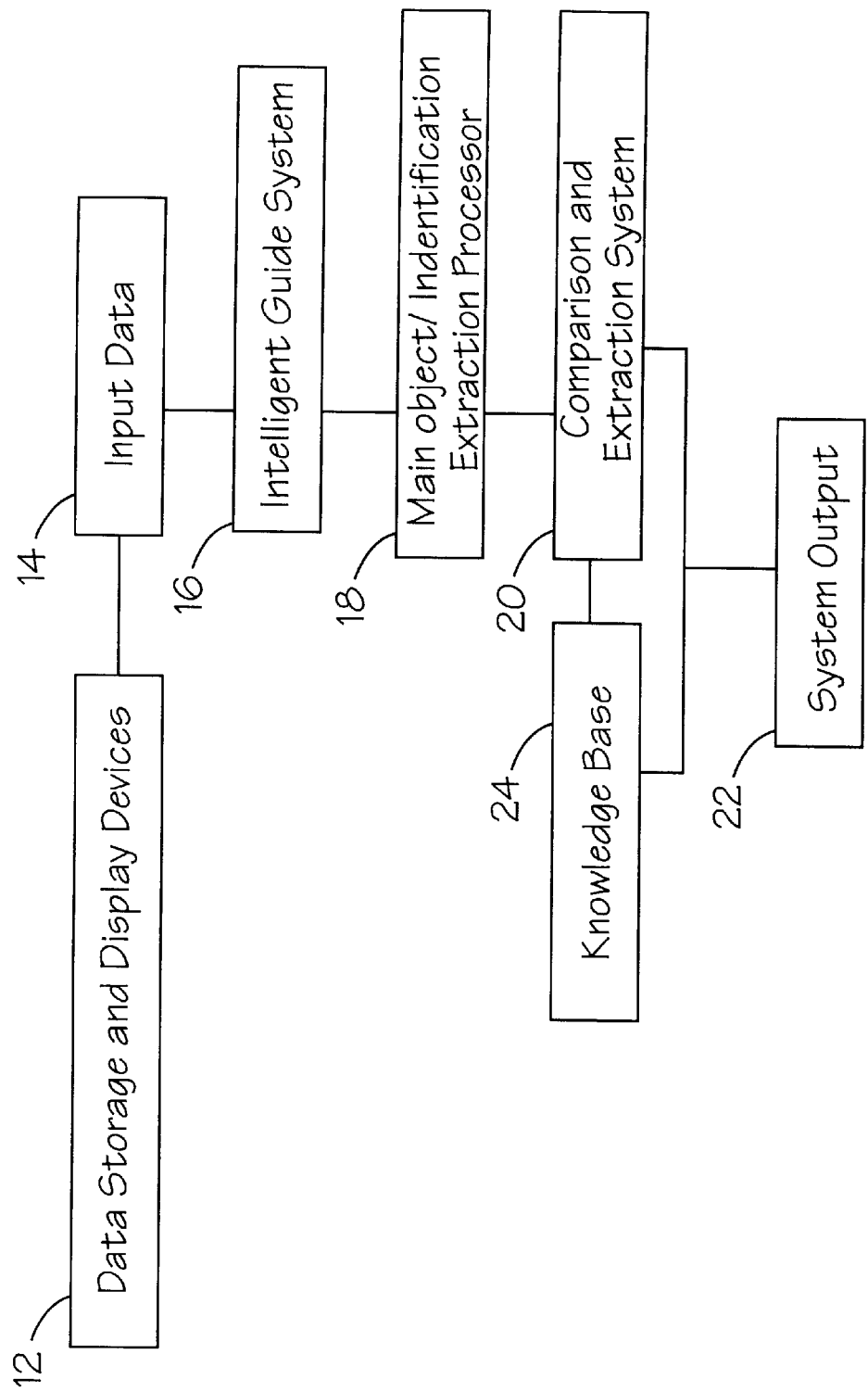
FIG. 2 is a block diagram representation of the processing system of the present invention.

Referring now to FIG. 2, there is shown the architecture of the processing system. An image of an object resides in data storage and display devices 12. Input data 14, in the form of maps, provides the object identification/recognition system using a human-like programming language with an intelligent graphic user interface (IGUI) 16. Data storage and display devices 12 contain means and medium for storing and displaying input and output data. The aforementioned subsystems are generally referred to as peripherals of a computer system.

A main object identification/extraction processor 18 processes the information representative of or relating to the image. The knowledge base 24 of the processing system stores the processing system's rule based files, matching library and GUI interpreter. The comparison and extraction system 20 compares the object image 12 with the knowledge base 24 in an effort to identify the object. In general, the objects to be extracted are not complex. In fact the number of objects to be extracted are few in number. The system output 22 of the processing system displays the results of the processing system for the user to interpret.

An intelligent GUI 16 is different from a conventional GUI. The intelligent GUI 16 has its own knowledge base and an interpreter, not shown, to convert the input information from the user to a compilable program. The intelligent GUI 16 can be viewed as a mini-computer inside a bigger computer, containing the following subsystems (not shown):

1) a data input window;
2) a data output window;
3) a data processing window that contains these system sub-components:
   a) a run window
   b) an expert modeler window
   c) an expert editor
   d) a general editor
   e) a pause window
   f) continue and stop
4) a data package window; and
5) a package or model description.

TABLE I represents the functional relationship between the intelligent GUI windows and the system sub-components. In the data input window, the user can display the desired data set sorted by a given extension. From the displayed data file, the user can highlight a particular data set as the input file. As a general rule, the desired input files are specified in the package file that runs the program.

TABLE I

| Window ID | Corresponding System Units | Functions |
| --- | --- | --- |
| Data Input | Data Storage and Display Device | Input, Output, and Display |
| Data Output | System Output | Input, Output, and Display |
| Data Processing | Main Object Identification and Recognition Process | Pre-processing, Analysis, and Post-processing |
| Data Package | Input Data | Data Input and Archiving |
| Package & Model | Knowledge Base | Providing Rules and Model Description |

The data output window is designed to show the output files specified by the package file that executes a particular application. In addition, the user can also specify the names of the output files interactively in the data output window.

The data processing window provides six command options. The run window or button, once clicked, executes the program in the package file. The pause button allows the user to display intermediate stage results. And the continue and stop button runs the program interactively.

The general editor allows one to view and/or modify a given algorithm, which will be compiled in real time if it is properly composed. In general, the run command is designed for a totally automated mode while the pause command is off. The expert modeler is designed to generate a compilable program by answering only a few questions without having to use a general editor. The expert editor lies at the middle of the expert modeler and a generic text editor. It is designed so that the user can generate a moderately complex program with little risk of making typing and syntax errors.

The package description window has two functions. First, it displays the general characteristics of a given package or program. Second, it provides a means for one to enter a description of a program. Most importantly, this window serves as a browser to select an appropriate program or package to extract a desired object. There is no need to write any program if the knowledge database contains an appropriate rule set. The foregoing system description also appears in U.S. Pat. No. 5,631,970.

Figure 3:
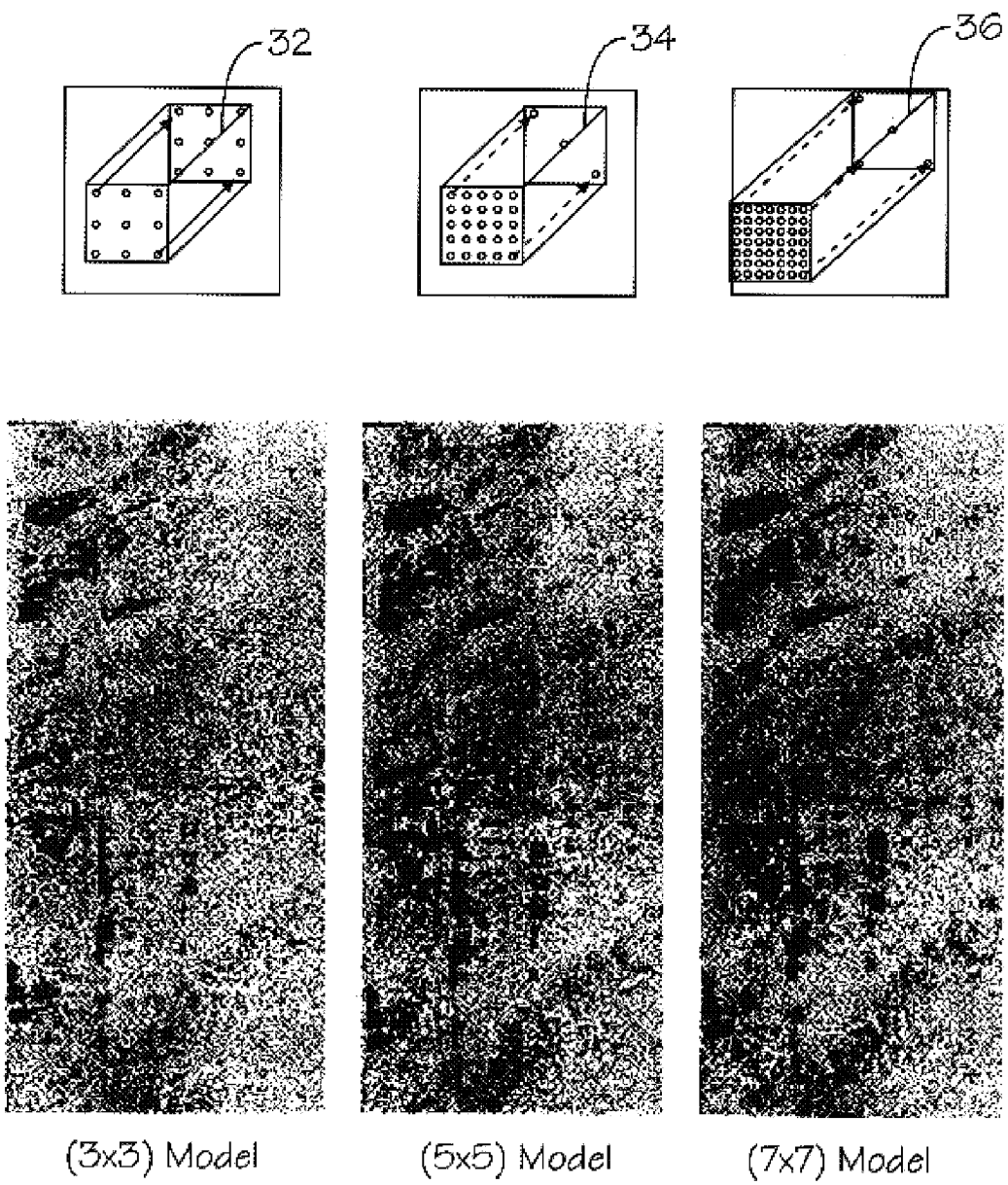
FIG. 3 is a schematic representation of three hyperspectral texture feature images.

Referring now to FIG. 3, three hyperspectral texture feature models are illustrated. Texture feature 32 is a 3×3 model having a color space transformation of a hue transform. Texture feature 34 is a 5×5 model having a color space transformation of a saturation transform. Texture feature 36 is a 7×7 model having a color space transform of an intensity transform.

TABLES II to VI represent the hyperspectral textures as they relate to actual spectral based features. TABLE II shows the partitioning of the hyperspectral image cube, which has more than 200 channels, into a number of discrete zones.

TABLE II

| Zone #1 | | .39502 to .72700 |
| Zone #2 | | .73776 to 1.54452 |
| Zone #3 | Band 119 to Band 158 | 1.55767 to 2.01235 |
| Zone #4 | Band 159 to Band 210 | 2.02272 to 2.490493 |

Table III indicates how a color image can be generated by three spectral bands.

TABLE III

| Band 1 coded | as Red |
| Band 2 coded | as Green |
| Band 3 coded | as Blue |

Table IV is a generalized model of the hyperspectral texture domain.

TABLE IV

| 210 Channel | 3 × 3 | Red Domain |
| 210 Channel | 5 × 5 | Green Domain |
| 210 Channel | 7 × 7 | Blue Domain |

TABLE V combines spectral and textural properties in one transformation.

TABLE V

| Error! Bookmark not defined.#60 to #118 Channel | 3 × 3 | Red Domain |
| #119 to #158 Channel | 3 × 3 | Green Domain |
| #159 to #210 Channel | 3 × 3 | Blue Domain |

TABLE VI associates data in the color domain with three additional transforms using red, green and blue inputs to create intensity, hue and saturation or IHS, respectively.

TABLE VI

| Input Bands | Transformed Bands |
| --- | --- |
| Error! Bookmark not defined.Red Band | Intensity |
| Green Band | Hue |
| Blue Band | Saturation |

Figure 4:
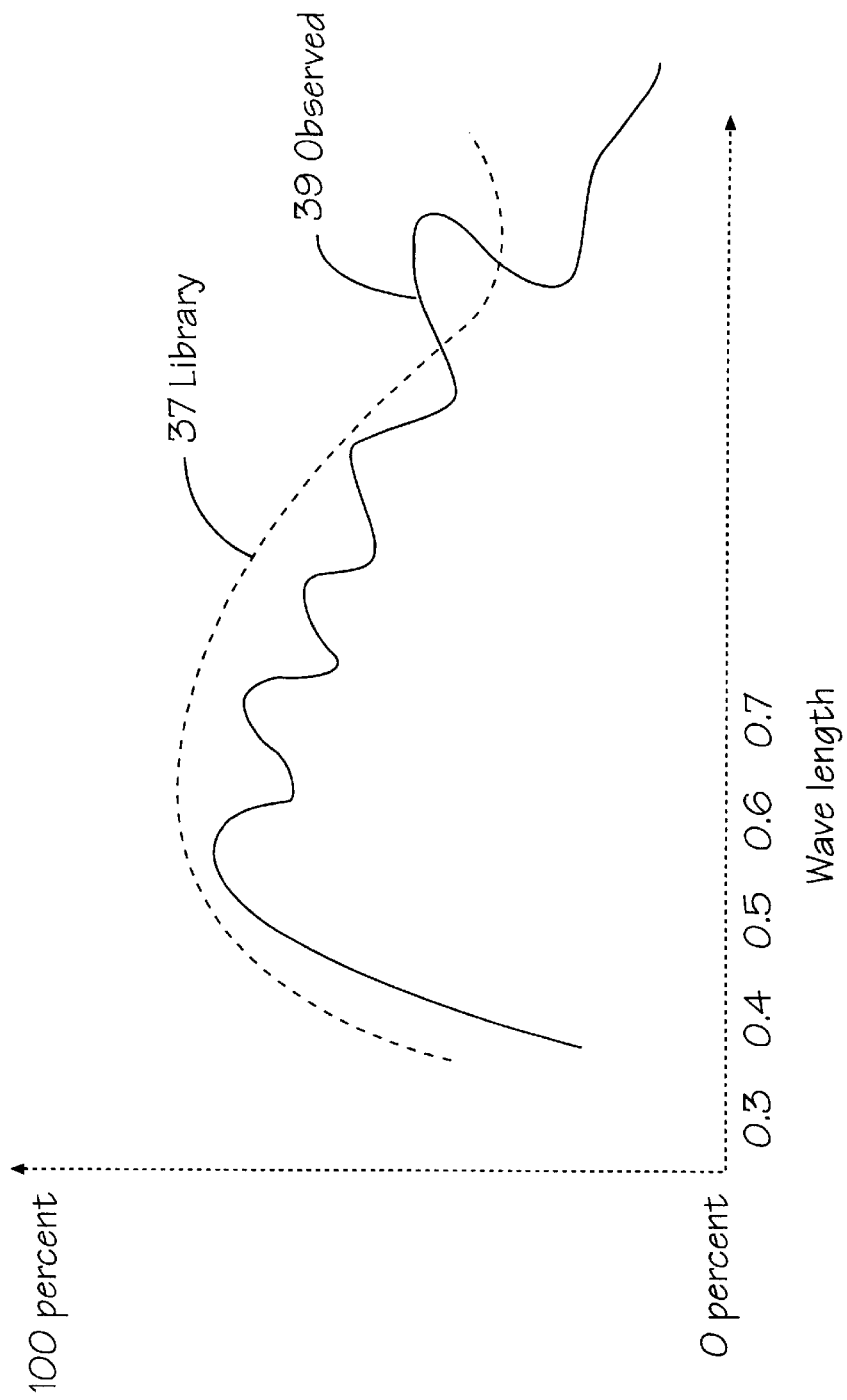
FIG. 4 depicts a graphical spectral signature based on reflectance, which is invariant over time and space.

Referring now to FIG. 4 a generic reflectance based spectral signature is illustrated. The target signatures in a predetermined spectral library 37 can find a match if an object of similar reflectance curve is in the observed hyperspectral image cube 39.

Figure 5:
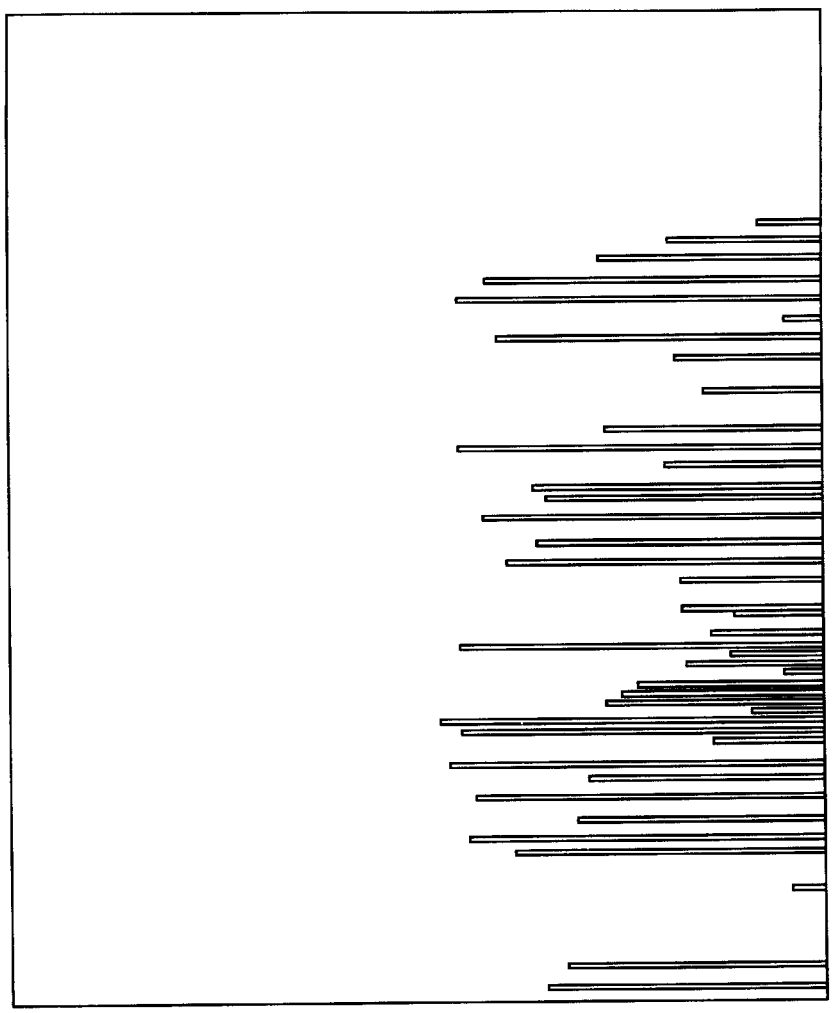
FIG. 5 is a spectral example of an observed hyperspectral pixel represented by a 3-D image.

Referring now to FIG. 5 there is shown an example of an observed hyperspectral pixel that is represented by a 3-D image. The original reflectance curve form 38 is maintained. The area under the curve 39 is graytone-shaded according to the magnitude of the curve. The minimum reflectance value is set to one so that the area under the curve is a contiguous region.

The background of the region is then set to zero. The elements of a matching library are composed of images constructed according to the above specifications. A pixel recognition analysis is performed by matching an observed pixel represented by a 3-D object against elements of a matching library. The classifier can be statistically-based and/or neural network based.

Figure 6:
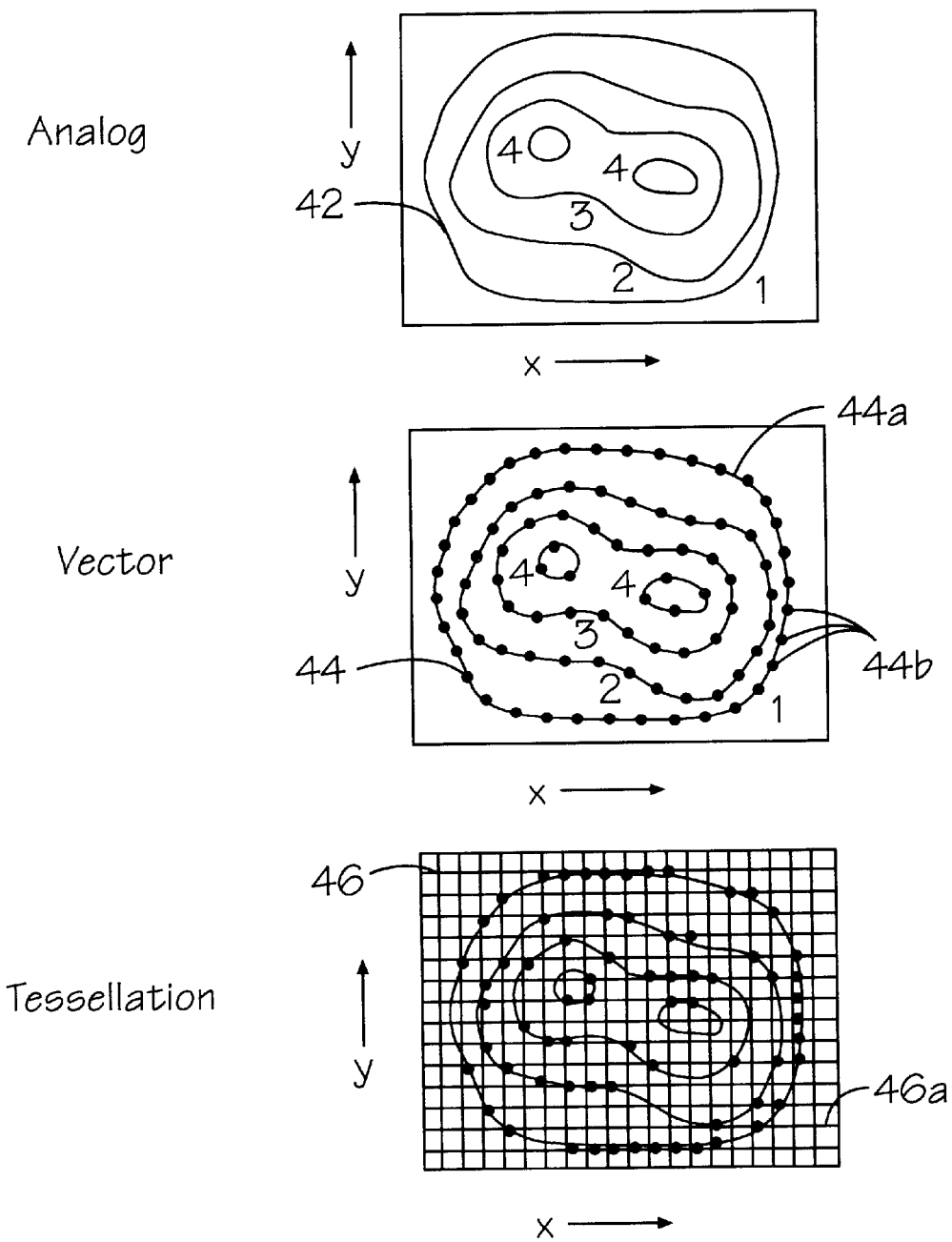
FIG. 6 is a data representation of an analog, vector and tessellation map.

Referring now also to FIG. 6, an illustration is presented of three data map models. Data maps are used to exhibit spatial features which can be represented by either raster or vector data models, or both simultaneously, yielding a hybrid raster/vector mode. Analog map 42 exhibits x and y coordinates based on the contours of the land. Vector map 44 comprises a line 44a, using vectors 44b to exhibit the location of land. Tessellation map 46 uses a grid 46a to help pinpoint the exact location of a designated area.

TABLE VII represents a vector format for Point, Line and Polygon. By utilizing various numbers such as 10 for point, 23 for line, and 63, 64 for a polygon, a data structure is defined. Fundamentally, an extracted feature in an image is a uniform region filled by a set of pixels having varying graytone values. The boundary of this feature exists when it has a background subset. Thus, theoretically, the boundary separating the feature from its background lies in between these two distinct regions. However, from a practical point of view, one can use the outermost pixels of the feature that contact the background pixels as the boundary file of the feature. One of the ways to vectorize a raster-based feature is to use this boundary file to represent the feature.

TABLE VII

| Feature | No. | Location Point |
|---|---|---|
| Point | 10 | X,Y (Single Point) |
| Line | 23 | $X_1,Y_1,X_2,Y_2,\ldots,X_n,Y_n$ (String) |
| Polygon | 63 | $X_1,Y_1,X_2,Y_2,\ldots,X_n,Y_n$ (Closed Loop) |
|  | 64 | $X_1,Y_1,X_2,Y_2,\ldots,X_n,Y_n$ (Data Structure) |

Figure 7:
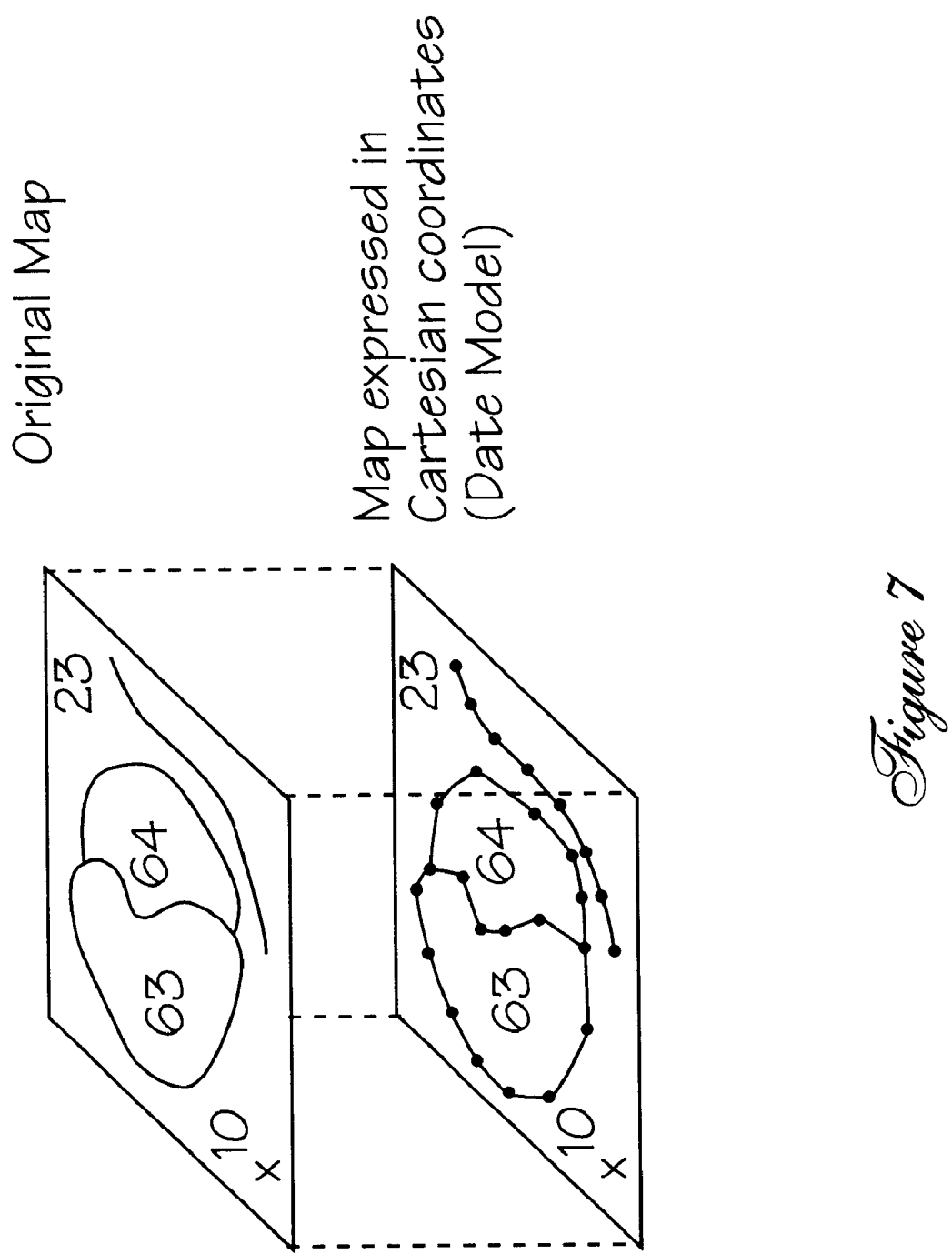
FIG. 7 is a vector representation with boundary pixels and raster representation with both interior and boundary pixels.

Referring now also to FIG. 7, there is shown a vector representation with boundary pixels and raster representation with both the interior and boundary pixels. The coordinates for FIG. 7 appear in TABLE VII. The coordinates are simulated on a data model which is expressed in Cartesian coordinates. A raster-based feature is vectorized to use the boundary file to represent the feature.

Referring now to FIG. 8 there is illustrated a typical data file where X is an interior pixel and b is a boundary pixel. The first element of the vector file in the lower portion of FIG. 8 is a numerical character of one, which is followed by a set of (x,y) coordinate numbers, followed by the word "END." This sequence is a vector based boundary file for Region #1. If a scene is composed of 100 regions, the last region ID code is 100. Region #1 is usually referred to as the background set, while region #2 is the feature set. A double end symbol, "END END", signals the end of a vector file.

Figure 9:
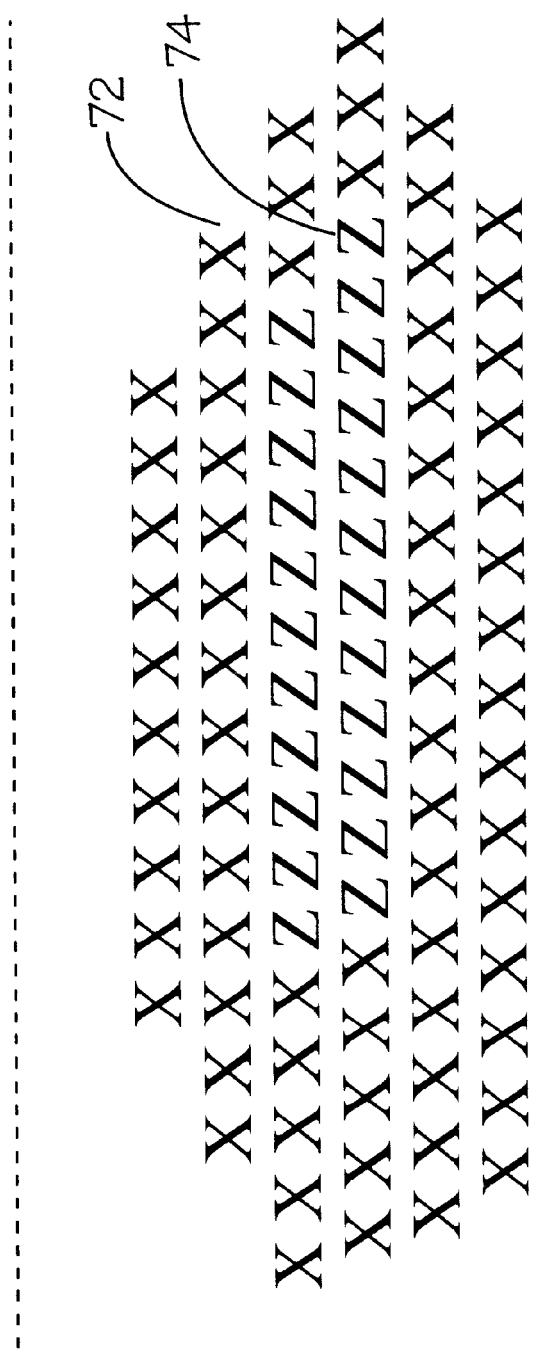
FIG. 9 is a schematic representation of a feature outside of another feature when a raster image is employed.

Referring now also to FIG. 9, there is illustrated a double boundary file structure. A boundary file structure is used to construct a vector file data. A raster image such as output from the main processor is used as a source for feature vectorization. In this case a raster image has one feature 72 which is outside of another feature 74. The outer boundary 72 represents one feature of the raster image vectorization while the inner boundary 74 represents the feature of the raster image imbedded in the outer boundary symbol 72.

Figure 10:
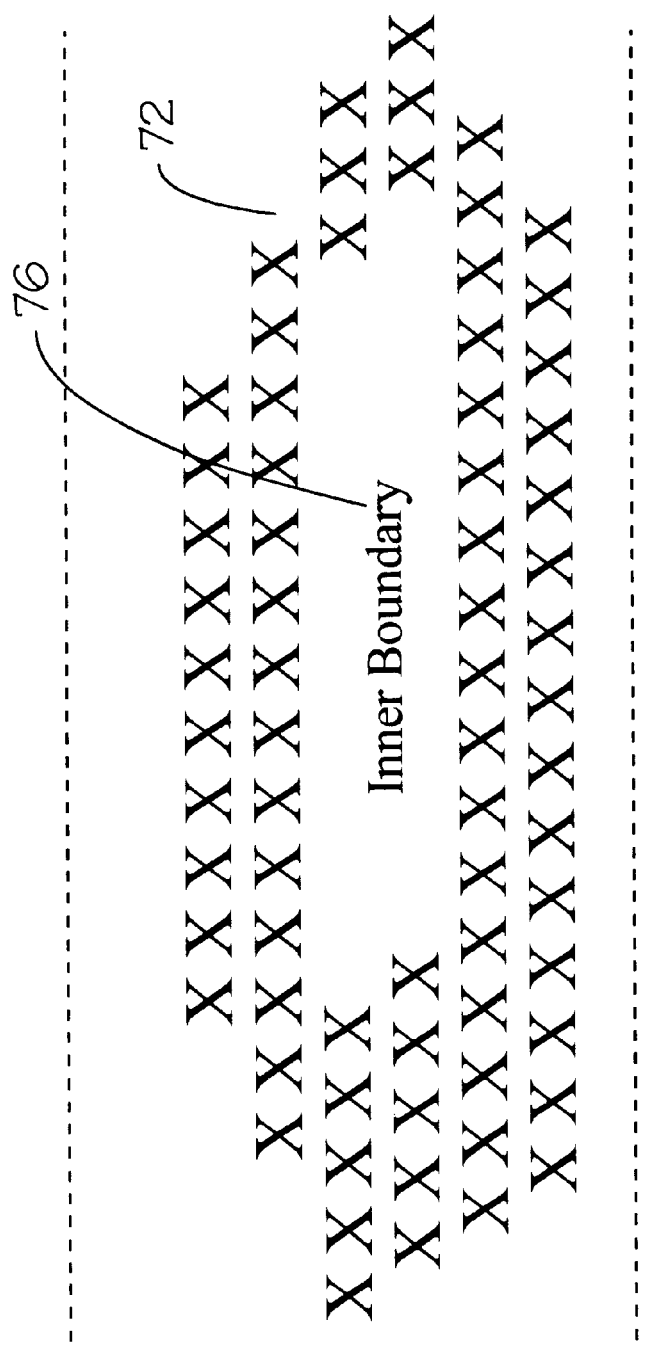
FIG. 10 is a visualization of a two-boundary file structure of a region if the interior feature set is removed.

Referring now also to FIG. 10, there is illustrated a two-boundary file structure of a region wherein the interior feature set is removed from the two boundary file structure. The outer boundary 72 is the only image used to represent the feature in the raster image from the main processor used to construct the vector data file. While the inner boundary 76 may be any feature that is in the raster image.

Figure 11:
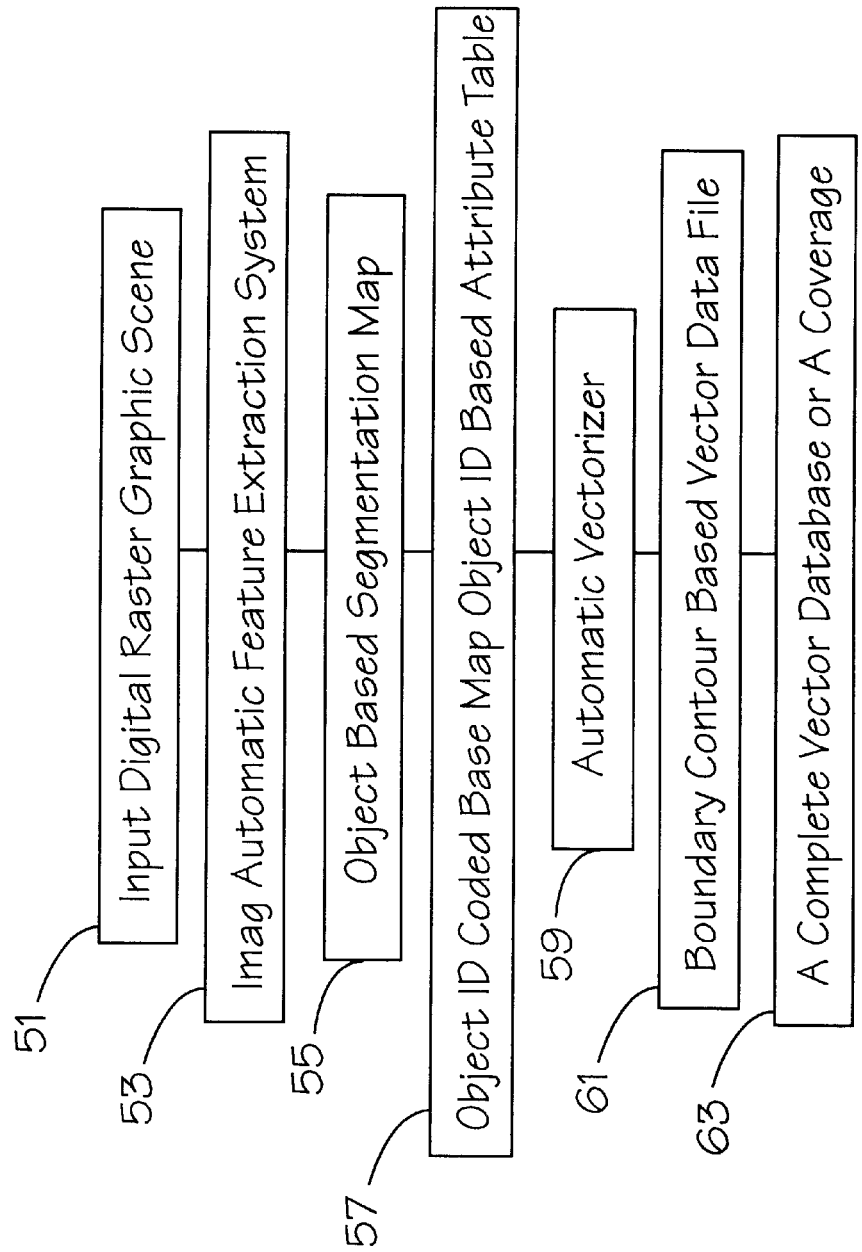
FIG. 11 illustrates a block diagram model for the entire information processing system.

Referring now also to FIG. 11, the entire information processing system of the invention is illustrated. The digital raster graphic scene 51, in the form of a scanned map or chart, such as an NOAA chart, is input to the system. The IMaG automatic feature extraction system 53 comprises a pseudo-English programming language with lexicon photo-interpreters. The object based segmentation map 55 is an NOAA raster nautical chart, scanned in as a colorized image. Colorized information is used to perform feature discrimination and recognition.

The object ID coded base map 57 is a matching library containing 10 numbers and 26 letters. Since the letters include upper, and lower case, with varying orientations, the matching library is built by labeling all variations of one character as one unique object. The object ID based attribute table is a depiction of the matching library as it exists in an attribute table.

The automatic vectorizer 59 has two elementary pattern recognition processes: recognizing individual block elements, and assembling the block elements together in a meaningful space base. The boundary contour based data file 61 incorporates boundary pixels instead of pixels. The pixels are captured by using a manual tracing method to generate a vector data file.

The complete vector database or a coverage 63 is the system output of the present invention which generally means a vector data file plus a corresponding feature attribute table (FAT) that describes the characteristics of the extracted feature by the use of coordinates. This invention provides a set of descriptors for each region, including location, tone, texture, size and shape information. The descriptors are usually generated automatically and need not be typed in manually.

Since other modifications and changes varied to fit particular operating requirements and environments will be apparent to those skilled in the art, this invention is not considered limited to the example chosen for purposes of this disclosure, and covers all changes and modifications which does not constitute departures from the true spirit and scope of this invention.

Having thus described the invention, what is desired to be protected by Letters Patent is presented in the subsequently appended claims.

what is claimed is:

1. A method for identifying an object in a region of an image, the steps comprising:
    a) storing spectral based objects in a first library;
    b) storing spatial based objects in a second library;
    c) storing rule based objects in a third library; and
    d) integrating said spectral based objects with said spatial based objects and with said rule based objects to increase confidence level of object identification.

2. A method for identifying an object in a region of an image in accordance with claim 1, the steps comprising:
    a) providing a pixel-based classification map comprising a plurality of regions of interest; and
    b) using integrating means to process said map and to generate a complex object that comprises said plurality of regions of interest, using information provided by a data expert.

3. The method for identifying an object in a region of an image in accordance with claim 2, wherein said integrating means comprises a human language program.

4. A method for identifying an object in a region of an image in accordance with claim 1, further comprising generating a geographic information system (GIS) database, the steps comprising:
    a) creating a base map;
    b) converting said base map into a segmented raster image, including a feature attribute table; and
    c) incorporating additional data in said attribute table.

5. A method for identifying an object in a region of an image in accordance with claim 4, wherein said database is updatable and multi-media for use in an object identification and extraction program.

6. A method for identifying an object in a region of an image in accordance with claim 5, wherein said database comprises text.

7. A method for identifying an object in a region of an image in accordance with claim 5, wherein said database comprises annotated images.

* * * * *